(12) United States Patent
Burridge

(10) Patent No.: US 6,430,567 B2
(45) Date of Patent: *Aug. 6, 2002

(54) METHOD AND APPARATUS FOR MULTI-USER AWARENESS AND COLLABORATION

(75) Inventor: Richard N. Burridge, Redwood City, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,063

(22) Filed: Jun. 30, 1998

(51) Int. Cl.$^7$ .............................................. G06F 17/00
(52) U.S. Cl. .......................... 707/102; 707/10; 707/104
(58) Field of Search ............................. 707/1, 100, 102, 707/200, 101, 104, 201, 10; 395/200, 334, 329, 335; 709/244

(56) References Cited

U.S. PATENT DOCUMENTS

| | | | | |
|---|---|---|---|---|
| 5,617,539 A | * | 4/1997 | Ludwig et al. | 395/200 |
| 5,796,393 A | * | 8/1998 | MacNaughton et al. | 345/329 |
| 5,887,139 A | * | 3/1999 | Madison, Jr. et al. | 395/200 |
| 5,905,493 A | * | 5/1999 | Belzer et al. | 345/334 |
| 5,918,010 A | * | 6/1999 | Appleman et al. | 395/200 |
| 5,956,491 A | * | 9/1999 | Marks | 395/200 |
| 6,005,568 A | * | 12/1999 | Simonoff et al. | 345/335 |
| 6,029,203 A | * | 2/2000 | Bhatia et al. | 709/244 |
| 6,039,688 A | * | 3/2000 | Doughlas | 600/300 |
| 6,061,716 A | * | 5/2000 | Moncreiff | 709/204 |
| 6,078,321 A | * | 6/2000 | Simonoff | 345/355 |
| 6,081,830 A | * | 6/2000 | Schindler | 709/204 |

OTHER PUBLICATIONS

*Science,* "An Economics Approach to Hard Computational Problems" Jan. 3, 1997, vol. 275, Bernardo A. Huberman, Rajan M. Lukose, Tad Hogg.
*Understanding the Chat Room Server*, Advanced Networking and Multiplayer Gaming Concepts, pp. 322–351.

* cited by examiner

*Primary Examiner*—James P. Trammell
*Assistant Examiner*—Mary Wang
(74) *Attorney, Agent, or Firm*—Martine & Penilla, LLP

(57) ABSTRACT

In embodiments of the present invention incorporate a facility to make a user, or client, aware of other users that are currently viewing the same Web, or display page. Functionality is provided in a browser to allow a user to initiate a collaboration operation with other users on the same Web page. A user provides user information to a registry via a registration process. The registry is further updated to include an entry identifying the page that is currently being viewed by a user. The user can access a collaboration interface to view a list of users that are currently viewing the same page as the user. The collaboration interface further allows the user to select a collaboration operation to collaborate with one or more users that are currently viewing the same page. In embodiments of the invention, the collaboration interface is generated by a Java applet and is contained within a portion of any general-purpose or special-purpose browser. The collaboration interface accepts input entered within an input field of the interface and processes it accordingly. A request to change Web pages updates the registry to reflect the new page. If the input is a request to initiate a collaborative operation, the collaboration interface initiates the operation.

21 Claims, 7 Drawing Sheets

METHOD AND APPARATUS FOR MULTI-USER AWARENESS AND COLLABORATION

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

BACKGROUND OF THE INVENTION

This invention relates to computer systems, and more particularly to collaboration between users of computer systems.

Computers can be interconnected via a local area network (LAN), a wide area network (WAN) and/or the Internet, for example. In a typical network, a computer that runs client software is a client computer, or client. A computer that runs server software is a server computer, or server. The server provides resources that can be accessed and shared by client computer users on the network based on requests that are sent to the server by a user.

Initially, users worked independently of other users. However, it has become desirable for users to share, or collaborate, in the development and review of information. For example, users may wish to view changes (e.g., simultaneously with the changes) and make updates to a graphic presentation. However, the client software that is widely used to access the Internet does not allow users to collaborate (i.e., is not collaborative-aware). As this software can also be used in an internal network configuration (i.e., an Intranet), it would be desirable for the software to allow user collaboration.

A user typically accesses the Internet using a software package referred to as a browser. A browser provides a graphic user interface (GUI) for displaying pages of information that a server sends to the client via the Internet. A page, or Web page, is typically defined using Hypertext Markup Language (HTML) statements that specify the pages GUI elements. A browser parses the HTML statements to generate and display the Web page in the browser's display area. The browser further provides a mechanism for the user to input information and/or submit a request which the browser forwards, via the Internet, to the appropriate Internet server. When a response is received at the user's computer, the browser parses the response (e.g., an HTML, document that defines a Web page).

There is currently no interaction available between users that are viewing pages in a general-purpose browser. It is not possible, for example, to determine the identity of other users currently viewing the same page. If a user was aware that a second user is also viewing the same page, the user might want to interact with the other user, perhaps regarding the page that they both are viewing. For example, users may wish to converse with each other using an electronic mail (email) application or chat software.

Email and chat software allow a user to send messages to other users over the Internet, for example. The message is received by a server and forwarded to the recipient. To chat with another user, a user must run client chat software and interact with a chat server that interprets chat commands. Where, for example, a chat command requests that a message be sent to another chat participant, the chat server forwards the message to the intended recipient.

One example of a chat environment is the "www.geocities.com" chat environment. To begin chatting, a user must first enter the requested user information (i.e., a name) and then select a chat category from a set of pre-determined categories (e.g., "Arts & Literature" and "Entertainment") and a room ("Athens", "Broadway" and "Paris") from a set of pre-determined rooms within the selected chat category. The chat environment user can move between rooms by selecting another of the pre-determined rooms within the selected category. Within each room, the user can see a list of users within that room and a list of all of the users within the selected category.

In the chat environment (e.g., the "www.geocities.com" chat environment), the user is limited to a predetermined set of categories and chat rooms within each of the categories. It is not possible for the user to exit the chat environment such that the user's chat environment name follows the user to another environment (e.g., the "www.yahoo.com" Web site). To enter another chat environment, a user must first enter the requested information at the new environment.

General-purpose browsers do not identify those users that are concurrently viewing Web pages. That is, it is currently not possible to use a general-purpose browser software application to identify concurrent users of a Web page for collaboration.

There are special-purpose browsers that have been developed for a collaborative environment. Users that wish to collaborate must use one of these special-purpose browsers. There are obvious disadvantages to using a special-purpose browser particularly given that the majority of Internet users run one of the popular general-purpose browsers (e.g., Netscape's Navigator, Communicator, etc. or Microsoft's Internet Explorer).

FIG. 1 provides an example of a special-purpose browser developed by PlaceWare, Inc., Mountain View, Calif. Browser 102 consists of areas 104, 106 and 108. Area 104 displays HTML-defined Web pages. Area 108 provides a list of collaborative-application rooms, or Web pages. One of the "Lobby", "1", "2" and "3" icons in area 108 can be selected by the user to display a collaborative-application room. The Web pages that are associated with "Lobby", "1", "2" and "3" support a specific collaboration application. The Web page is displayed in area 104. Area 106 contains a list of users that are currently viewing the page that is being displayed in area 104.

Collaboration is limited to one of the specific collaboration applications represented by the "Lobby", "1", "2" and "3" icons. That is, to be able to view the user list in area 106 and to collaborate with a user in the user list, it is necessary in browser 102 to access one of the "Lobby", "1", "2" and "3" collaboration application Web pages. It is not possible, for example, to collaborate with another user that is viewing another Web page (e.g., a non-collaboration Web page). For example, browser 102 does not identify the users that are viewing the "www.yahoo.com" Web page.

Another special-purpose browser approach, provided in a product called WebCanal by Inria (France's National Institute for Research in Computer Science & Control), requires that one browser be the master browser and all of the other browsers be slave browsers. When the master browser changes Web pages, the slave browsers' Web page is changed to reflect the master browser's Web page. Thus, the master browser controls what the slave browsers view. The slave browser does not navigate through Web pages independent of the master browser.

SUMMARY OF THE INVENTION

Embodiments of the present invention incorporate a facility to make a user aware of other users that are currently viewing the same browser page within any general or special-purpose browser. Functionality is also provided in the browser to allow a user to initiate a collaboration operation with other users on the same Web page.

A user provides user information to a registry via a registration process. The registry retains the information supplied by the user. The registry is further updated to identify the page that is currently being viewed by a user. The user can access a collaboration interface to view a list of users that are currently viewing the same page as the user. The collaboration interface further allows the user to select a collaboration operation to collaborate with one or more users that are currently viewing the same page.

In embodiments of the invention, the collaboration interface is contained within a portion of the browser. The collaboration interface is implemented as an application program (e.g., an applet) that can run in any of the currently available browsers (e.g., any general-purpose or special-purpose browser). The collaboration interface accepts input entered within an input field of the interface and processes it accordingly. A request to change pages causes the registry to be updated to reflect the new page. The new page is displayed within a window (e.g., a frame) within the browser window. If the input is a request to initiate a collaborative operation, the collaboration interface initiates the operation.

During the registration process, a user provides registration information that is stored in the registry. For example, the user can supply a name, address and email address that is stored in the registry. Other information can be used as a supplement and/or replacement for this information. The collaboration applet, the page that contains the applet is sent back to user's browser. The applet is initiated on the user's computer and the applet's interface is displayed within the browser.

The applet interface includes an area for specifying a new page. For example, the user can identify a new page by supplying the page's uniform resource locator (URL).

DETAILED DESCRIPTION OF THE INVENTION

A method and apparatus for multi-user awareness and collaboration is described. In the following description, numerous specific details are set forth in order to provide a more thorough description of the present invention. It will be apparent, however, to one skilled, in the art, that the present invention may be practiced without these specific details. In other instances, well-known features have not been described in detail so as not to obscure the invention.

Embodiment of Computer Execution Environment (Hardware)

Figure 1:
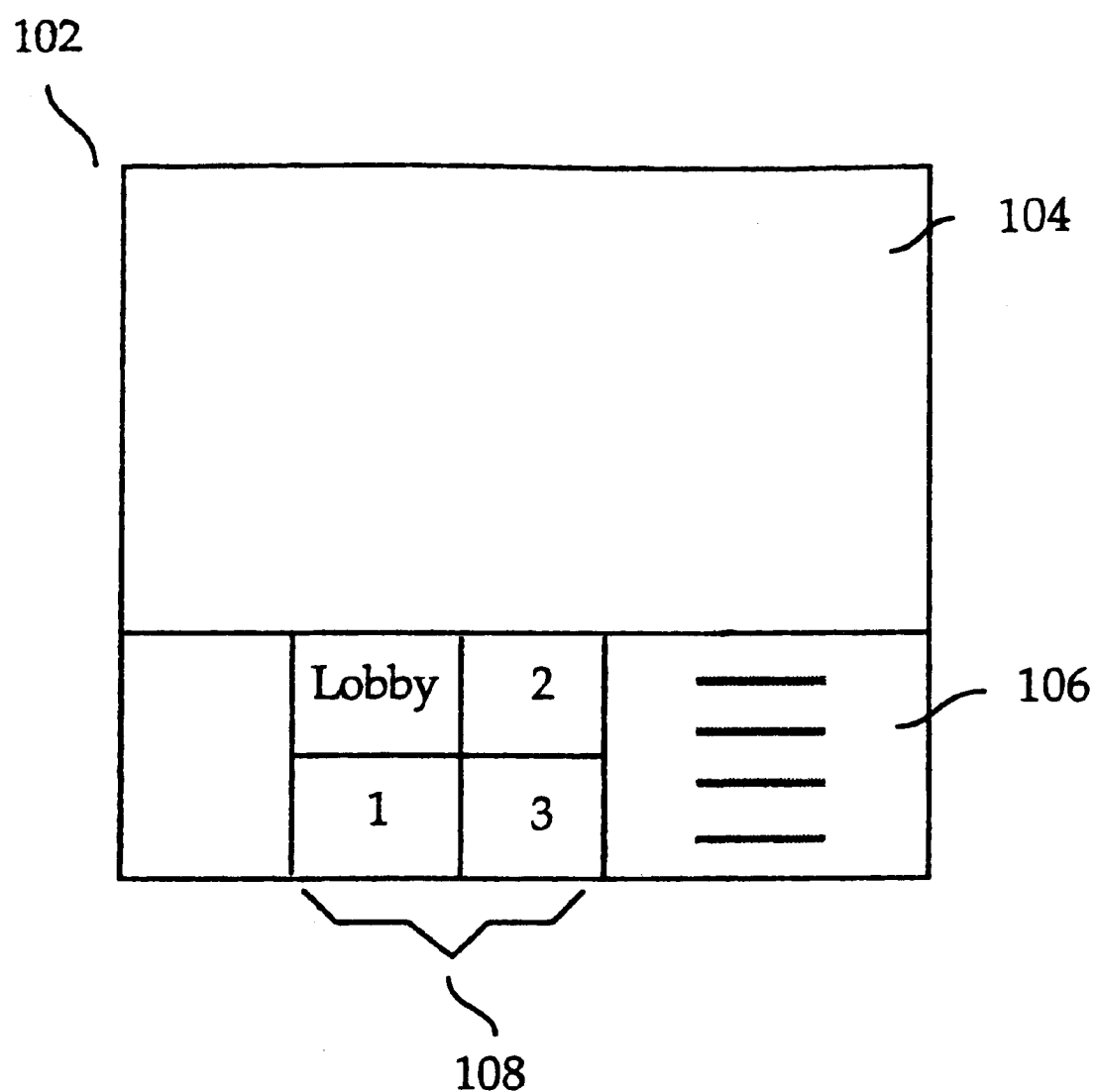
FIG. 1 provides an example of special-purpose browser environment.
Figure 2:
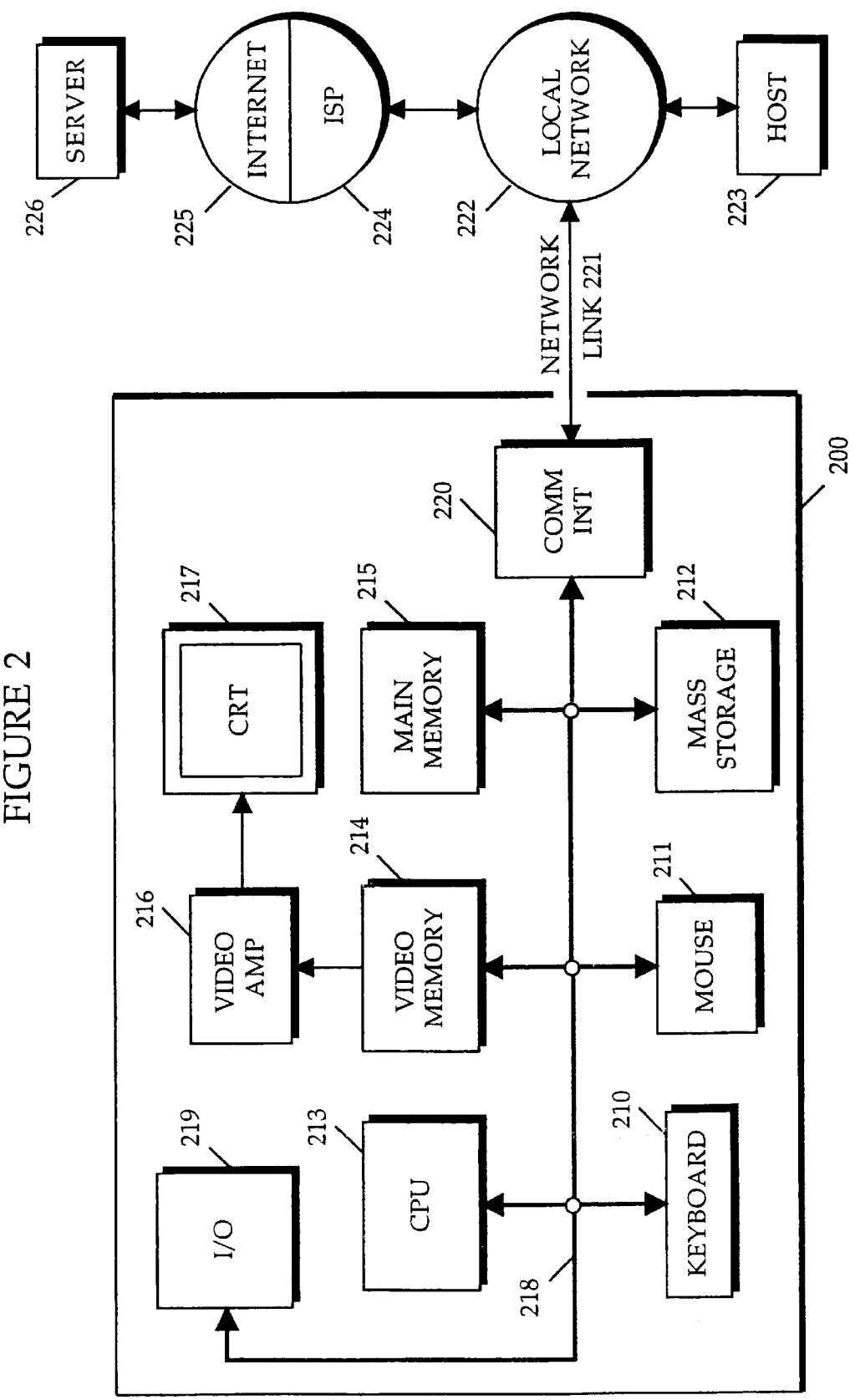
FIG. 2 provides an example of an embodiment of a computer execution environment suitable for executing embodiments of the invention.

An embodiment of the invention can be implemented as computer software in the form of computer readable program code executed on a general-purpose computer such as computer 200 illustrated in FIG. 2. A keyboard 210 and mouse 211 are coupled to a bi-directional system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to bidirectional system bus 218 represents such I/O elements as a printer, A/V (audio/video) I/O, etc.

Computer 200 includes a video memory 214, main memory 215 and mass storage 212, all coupled to bidirectional system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured-by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the, cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the method and apparatus for multi-user awareness and collaboration described herein.

The received code may be executed by processor 213 as it is received, and/or stored in mass storage 212, or other non-volatile storage for later execution. In this manner, computer 200 may obtain application code by way of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer system described above is for purposes of example only. An embodiment of the invention may be implemented in any type of computer system or programming or processing environment including, but not limited to, an embedded system.

Browser Environment

Embodiments of the invention are implemented as a software program that runs within any general-purpose or special-purpose browser software program (e.g., Netscape's Navigator and Microsoft's Internet Explorer). In one embodiment of the invention the software program is comprised of a collaboration applet written in the Java programming language.

The Java programming language can be used to develop platform-independent programs. That is, programs that can run on multiple hardware and software platforms. A compiler is used to translate the high level program statements into platform-independent machine code. A Java virtual machine that includes a compiler or other translator executing on a specific platform translates the platform-independent machine code into platform specific machine code. It should be apparent that embodiments of the invention can be implemented using any programming language in addition to the Java programming language. However, it is beneficial to implement platform-independent program code.

The collaboration applet captures the viewing location of registered users and includes an interface for selecting collaboration environments and/or collaboration operations. Using embodiments of the invention, a user can view a list of users that are currently viewing the same page. The user can choose one of the collaboration environments and/or collaboration operations within a collaboration environment.

Examples of collaboration environments include, but are not limited to, a chat room; electronic mail; a shared white board application, a text editing application, bug tracking and network games.

The shared white board environment allows a user viewing the white board to see the changes made by another user (e.g., a line drawn by one user is seen by the other user). Operations within a shared white board environment may include modifying or adding to the white board presentation.

In a text editing environment, a user can view a document to see the change(s) made by another user. A user might select operations to edit the document that is currently being viewed (and modified) by other users.

A shared bug tracking system allows users to view changes to software bug data (e.g., additions and status modifications). Users of the bug tracking system can select operations to add entries to the bug tracking system and make modifications to existing entries. Network gaming allows a user to play a game with other users.

Figure 3:
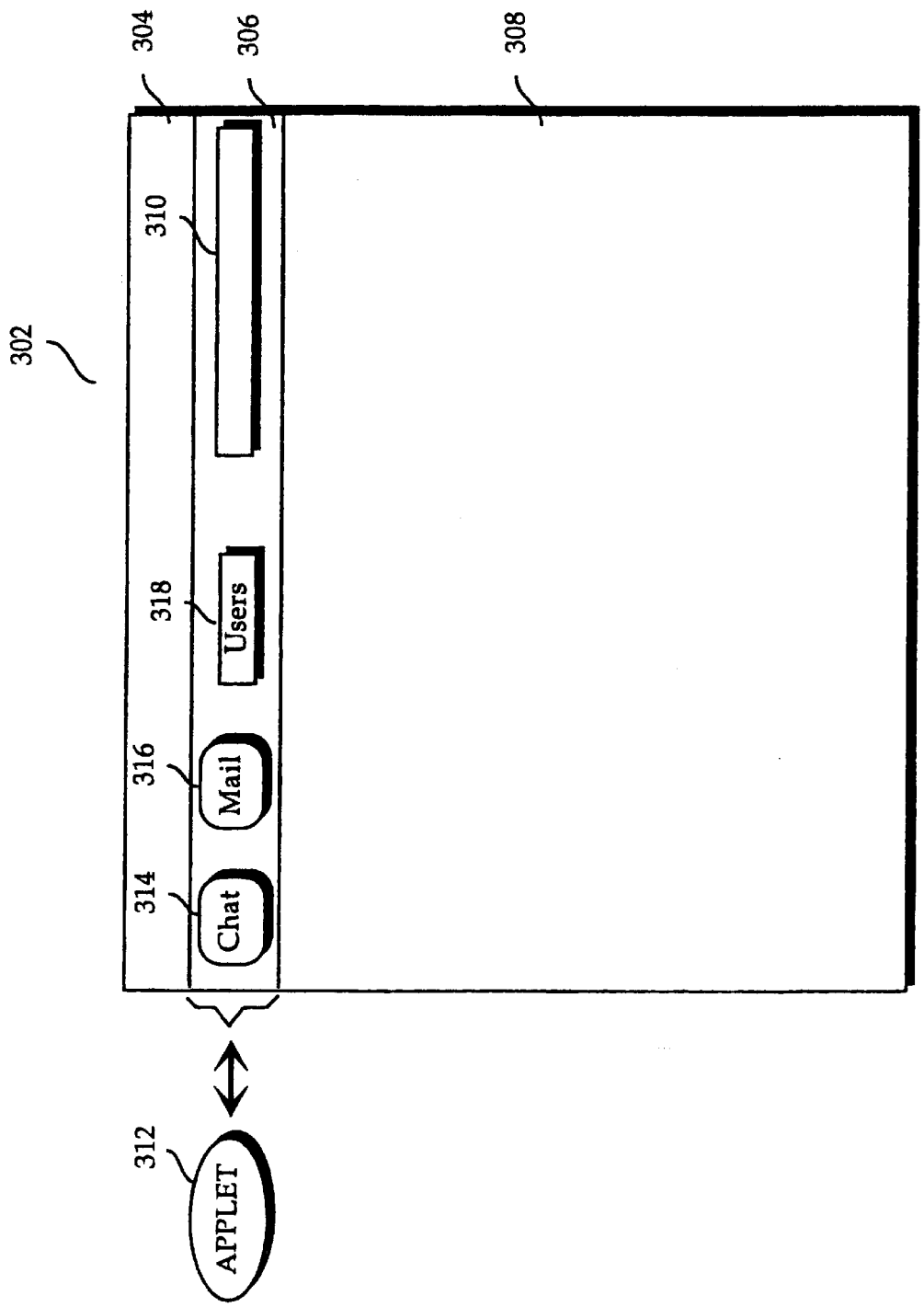
FIG. 3 provides an example of a browser that includes a collaboration interface according to an embodiment of the invention.

FIG. 3 provides an example of a browser that includes a collaboration interface according to an embodiment of the invention. Browser 302 can be any general-purpose or special-purpose browser. Browser 302 can be Netscape's Communicator or Microsoft's Internet Explorer, for example. Browser 302 can also be a special-purpose browser that is capable of executing an applet (i.e., a Java-enabled browser). The layout depicted in FIG. 3 is for the sake of an example only. It should be apparent that any layout can be used with embodiments of the invention.

Browser 302 includes section 308 for displaying output generated by browser 302 and applets running within browser 302. Thus, for example, browser 302 displays GUI elements defined by an HTML document in section 308. Further, section 308 can include output generated by an applet.

Browser 302 includes command section 304. Command section 304 can include buttons for "Back", "Forward", "Home", "Edit", "Reload", "Print" and "Find" operations, for example. Browser 302 displays a page of information that is defined by a Hypertext Markup Language (HTML) document that is retrieved from a computer site (e.g., a server) available via the Internet. One page can be designated as the user's home page. The "Home" button is used to return to the user's home page. The "Back", "Forward" buttons are used to display a previous or subsequent page of the current page. The "Reload" button reloads the current page. The "Print" button prints the displayed page. The "Find" button can be used to find a text string within the currently displayed page.

Collaboration applet 312 generates a graphical user interface (GUI) 306 that is displayed within browser 302. GUI 306 includes input field 310 that allows the user to specify a location or address of a Web page to display within section 308 of browser 302. The user typically specifies a Web page using a Uniform Resource Locator (URL). A URL identifies the server on which the Web page is located and the file (or files) that contains a definition for the Web page. The URL is one example of an identifier that can be used to locate information. However, it should be apparent that other identifiers can be used to locate information. For example, in a file system, a full pathname is used to identify the physical storage location of a file. The pathname identifies the name of the file and all of the directories that lead to a file. The full pathname typically specifies the drive and, in a client-server environment, server on which the file is located.

Collaboration applet 312 forwards the URL of the Web page requested by the user via the Internet to a server. The request is forwarded to the server identified in the URL where the request is processed and a response is transmitted back to the user's (i.e., client) computer. In addition, the URL is stored in an information repository by server-side software. The information repository therefore contains information to identify the Web page that is currently being viewed by a user.

In addition to input field 310, the collaboration applet generates GUI elements (e.g., pull-down menus and buttons) that allow the user to specify collaboration operations. For example, button 314 allows a user to request a chat operation. Collaboration applet 312 transmits the request to a server that can process the request. For example, the server can forward one or more pages and/or applets that allow the user to enter a chat with other collaboration users.

Button 316 provides another example of a collaboration operation that might be specified by the user using GUI 306 of collaboration applet 312. Button 316 allows a user to initiate a mail function for sending a mail message to another collaboration user.

Menu 318 is a pull-down menu that identifies the other users that are currently viewing the same page as the user. Thus, a user can open menu 318 to identify other collaboration users and then select a collaboration operation (e.g., chat button 314 or mail button 316) to interact with one or more of the collaboration users.

Figure 4:
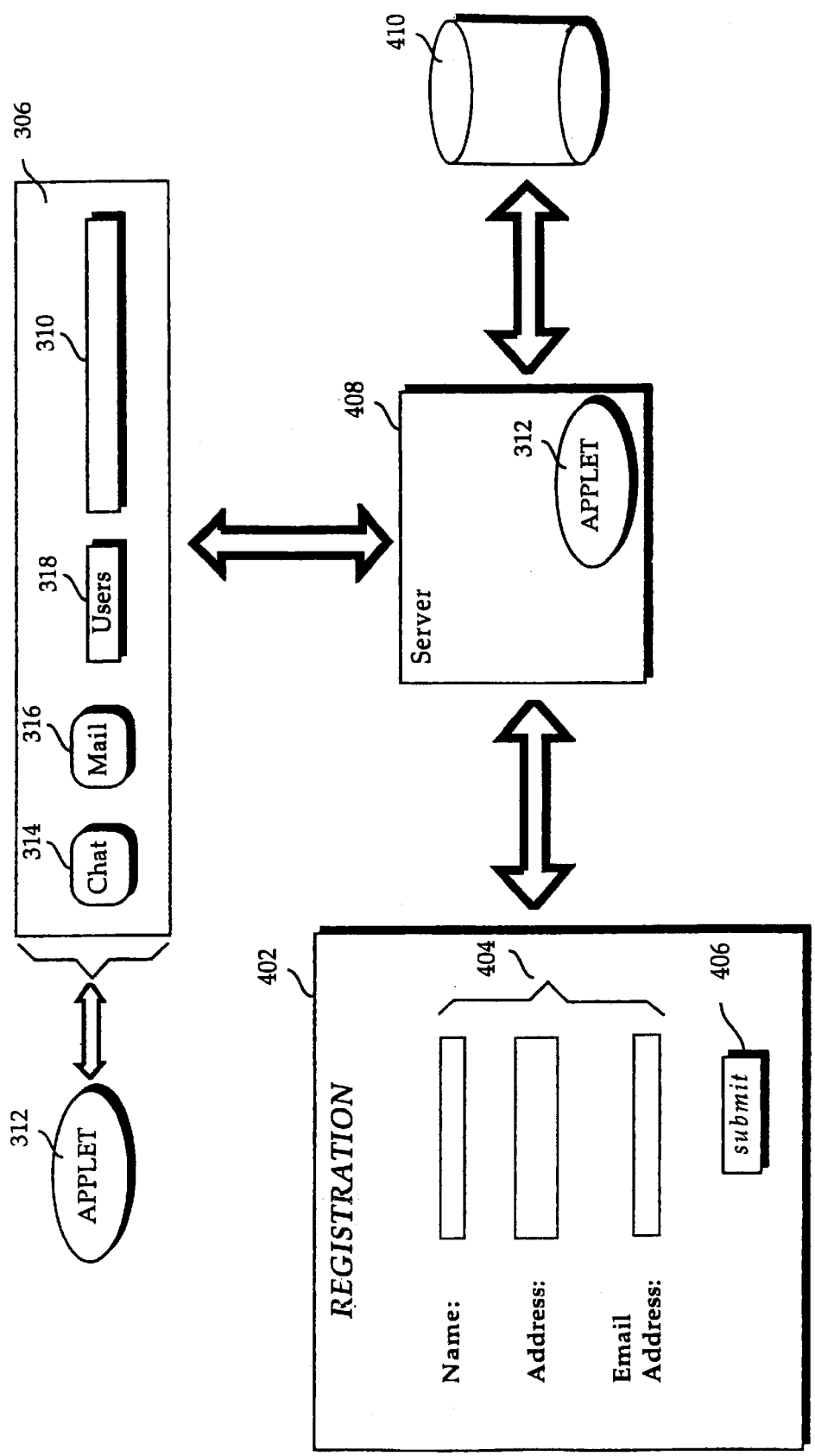
FIG. 4 illustrates GUI interfaces and interactions with a server and registry according to one or more embodiments of the invention.

In one or more embodiments of the invention, the user undergoes a registration process during which the user enters user information in a client computer which is transmitted to a server for storage in a registry. Collaboration applet 306 is sent to the registered user's computer for execution in the browser running on the client computer. FIG. 4 illustrates GUI interfaces and interactions with a server and registry according to one or more embodiments of the invention.

Registration page 402 is displayed in section 308 of browser 302 on a user's computer display. The user can request registration page 402 in a manner typically such as a URL, for example. A collaboration server (e.g., server 408) responds to the request by transmitting a definition of registration page 402 (e.g., an HTML document) to browser 302. Browser 302 parses the definition and displays registration page 402. It should be apparent to one skilled in the art that registration page 402 can be modified to include additional or replacement information.

Illustratively, registration page 402 includes input fields 404 for entering information including user identification information. Input fields 404 include fields for identifying the user's name, address, and email address. The user selects submit button 406 to submit the registration information. Registration page 402 along with the information entered into registration page 402 is transmitted to server 408. Server 408 processes the registration information and stores it in repository 410. Repository 410 can be a database that is maintained by a database management system (DBMS) server, a flat file that is maintained by a file system, or any other type of persistent data storage medium.

It should be apparent that other registration techniques can be used in embodiments of the invention. For example, a cookie driven auto-registration technique can be used wherein user information stored on a client computer (e.g., a cookie) contains registration information. Server 408 can examine the stored information and retrieve the registration information in response to a request for registration. There is no need for the user to enter the registration information in registration page 402.

Collaboration applet 312 is transmitted to browser 302 and GUI 306 is displayed within browser 302. Input to collaboration applet 312 such as a collaboration operation selection or location specification is transmitted to server 408. Information entered into fields of GUI 306 can be transmitted to server 408 for storage in repository 410. Further, commands initiated by a user in GUI 306 can be sent to and processed by server 408.

Embodiments of the invention facilitate collaboration between users using the execution environment that each user has already adopted and to which each is familiar. That is, collaboration applet 312 can execute in any of the general-purpose or special-purpose browser software products. Users can collaborate using different browsers as well, for example. A user executing Netscape's Navigator on a client computer can collaborate with another user whose computer is running Microsoft's Internet Explorer as well as a user that is using a special-purpose browser such as Inria's WebCanal.

A client computer's browser executing collaboration applet 312 may interact with one or more servers for registration and collaboration. The servers interact with the client computer to obtain registration information, download collaboration applet 312 and process input generated in collaboration applet 312.

It should be apparent that there can be more than one information repository. In one embodiment of the invention, a server maintains user registration and collaboration information for each user (e.g., each user of collaboration applet 312) that logs in to that server. The server's repository contains information that can be used to generate a list of users that are currently viewing a given Web page.

The information stored in multiple repositories (e.g., by multiple servers) can be merged to generate a complete set of user information. The merged information can be stored at a centralized site and forwarded to a server. The information can be forwarded to a server upon request, for example. When a server updates its registration information, it can forward the update(s) to the centralized site. Alternatively, a server can send updates to each server that has requested updates.

Figure 5A:
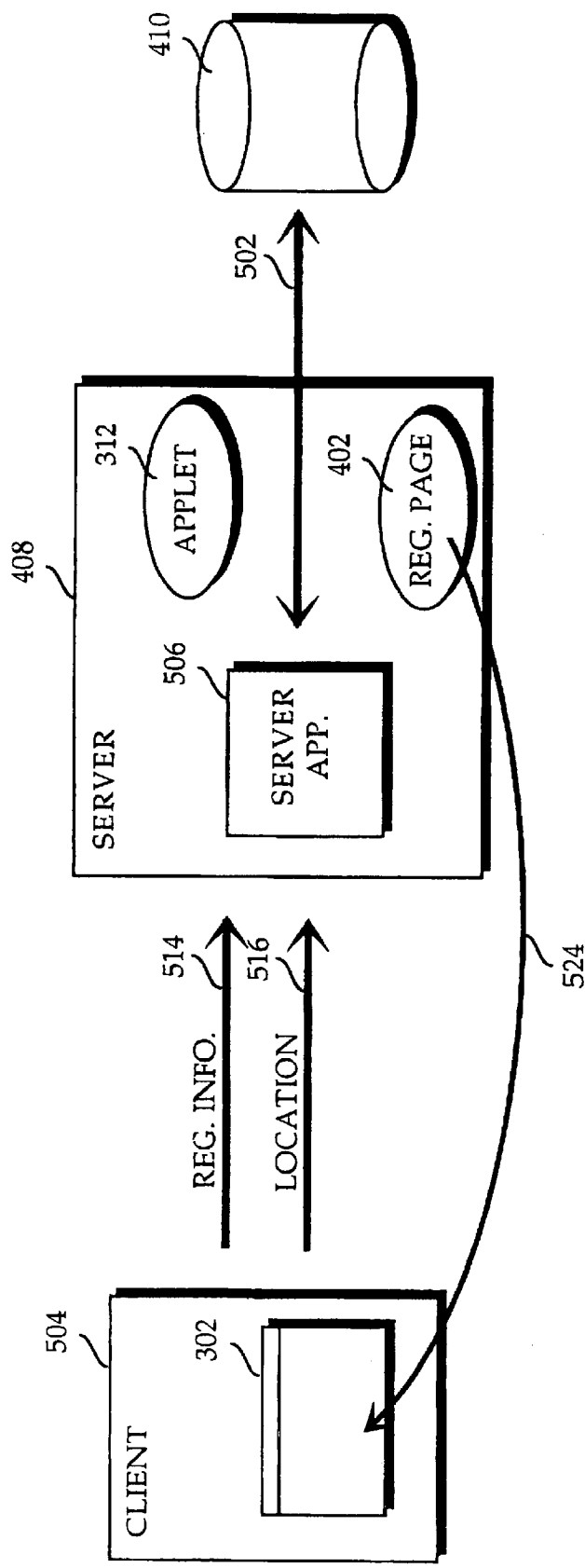
FIGS. 5A–5B provide examples of the information flow between a collaboration user and a server according to an embodiment of the invention.
Figure 5B:
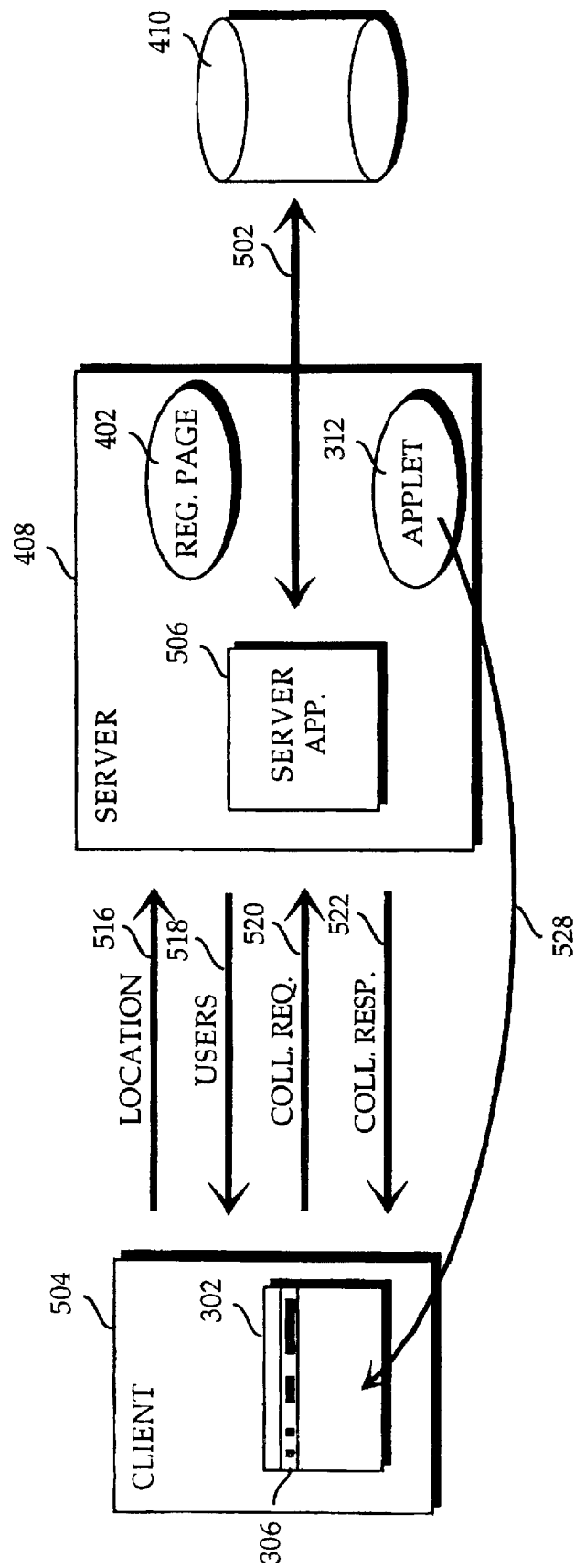

Collaboration applet 312 running in browser 302 transmits user information to a server that stores the information in repository 410. Further, collaboration applet 312 forwards collaboration requests to a server for processing a response. FIGS. 5A–5B provide examples of the information flow between a collaboration user's computer and a server according to an embodiment of the invention. In FIGS. 5A–5B, collaboration applet 312 is depicted on the same server as registration page 402 for the sake of simplicity. It should be apparent, however, that collaboration applet 312 and registration page 402 need not reside on the same server.

Referring to FIG. 5A, client system 504 is executing browser 302. A user of client system 504 requests registration page 402 from server 408. server 408 processes the request and sends registration page 402 (via transmission 524) to browser 302. Browser 302 displays registration page 402 in, for example, section 308 of browser 302.

A user enters the registration information and presses the submit button (e.g., submit button 406). The registration information is transmitted (via transmission 514) from browser 302 on client computer 504 to server 408. Server application 506 running on server 408 receives the registration information and stores it in repository 410 (via transmission 502).

Referring to FIG. 5B, server 408 transmits collaboration applet 312 (via transmission 528) to client computer 504. Collaboration applet 312 executes on client computer 504 and generates GUI 306 which is displayed within browser 302 (e.g., as a frame within browser 302). The user can enter a URL or other location specification for a Web page in input field 310. The Web page request is transmitted (via transmission 516) to server 408. If the request cannot be satisfied by server 408 (e.g., the requested Web page is not resident on server 408), the request is forwarded over the Internet to the appropriate server which returns the Web page document to client computer 504. Server application 506 can generate a list of collaboration users that are currently viewing the same Web page. The list of users is transmitted (via transmission 518) for display in GUI 306 in response to a selection of pull-down menu 318 of GUI 306.

A collaboration request is transmitted (via transmission 520) to server 408. A response to the collaboration request is transmitted (via transmission 522) to client computer 504 by server 408. If the collaboration request is directed to another server, server 408 can forward the request to the specified server for processing. A collaboration response can be, for example, a chat or email applet that allows a user to chat with, or send a message to, other collaboration users. Other examples of collaborative responses include applets, or application software, that allow a user to view and update information that is being shared and viewed by other users (e.g., a text editing application).

In one or more embodiments of the invention, a user registers with a collaboration application running on a server. The server enters the information in repository 410. As the user navigates through the Internet using input field 310 in GUI 306 generated by collaboration applet 312, the collaboration application stores the navigational information in repository 410. The collaboration application examines the contents of one or more repositories to generate a list of users that are currently viewing the same page. The list is transmitted to client computer 504 for display in pull-down menu 318 in GUI 306. Thus, it is possible for a user to be aware of the users that are viewing the same page. Further, the user can make collaboration selections within GUI 306.

Figure 6:
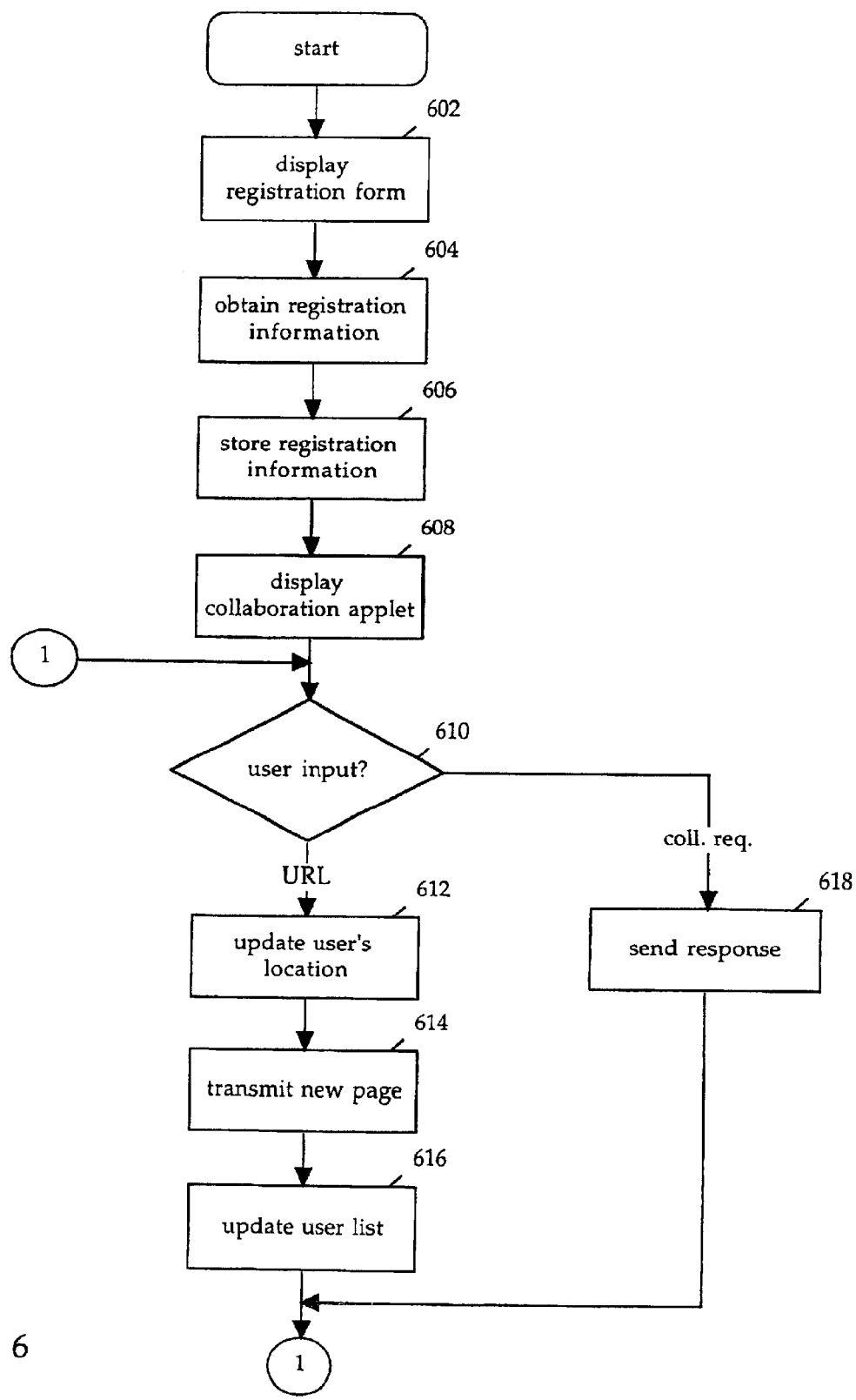
FIG. 6 provides a process flow for multi-user awareness and collaboration according to one embodiment of the invention.

FIG. 6 provides a process flow for multi-user awareness and collaboration according to one embodiment of the invention. At step 602, a registration form is displayed in an area of the user's browser (e.g., section 308 of browser 302). Registration page 402 is sent to the user in response to a request entered by the user. The user can enter the URL for registration page 402, for example. Alternatively, the user can indicate in a preference setting of browser 306 that registration page 402 is the initial (or home) page. In this case, registration page 402 is automatically displayed when browser 302 is invoked or when the "Home" command is selected by the user.

Once registration page 402 is displayed in browser 302, the user can submit the registration information. At step 604, registration information is obtained from the user and, at step 606, the information is stored in a repository. Collaboration applet 312 is sent to the user. At step 608, GUI 306 of collaboration applet 312 is displayed in browser 302.

At step 610, a determination is made whether user input is received from collaboration applet 312. If user input is received in the form of a collaboration request, processing continues at step 618 to process and respond to the request. Processing continues at step 610 to process subsequent user input.

If user input is received in the form of a URL for a new Web page, processing continues at step 612 to update the repository to include the new Web page request from the user. The repository includes the new Web page information. The repository can further be used to store information that reflects a history of viewed pages.

At step 614, the new Web page is transmitted to client computer 504. At step 616, the list of users that are currently viewing the same Web page is updated. Alternatively, step 616 can be performed when the user selects pull-down menu 318 of GUI 306. Processing continues at step 610 to process subsequent input.

In one or more embodiments of the invention, a user can identify a user (e.g., user listed in menu 318) to follow or chase. That is, the user can follow a second user as the second user changes to a new Web page. When the second user identifies a new Web page in input field 310, the first user is transitioned to the new Web page as well. The Web page definition for the new Web page is sent to both users. In this way, the first user views the Web page specified, and viewed, by the second user.

Thus, a method and apparatus for multi-user awareness and collaboration has been provided in conjunction with one or more specific embodiments. The invention is defined by the claims and their full scope of equivalents.

What is claimed is:

1. A method for multi-user awareness and collaboration in a computer network environment, comprising:

obtaining registration information from a network user, said registration information comprising said network user's identification, name, and electronic mail address;

retaining said registration information in a repository of user information;

capturing an address specification for a network resource requested by said network user, wherein said network resource does not provide a direct access to a chat room;

storing said address specification in said repository of user information, said repository of user information having identification information of all network users currently viewing said network resource;

generating from said repository of user information a list comprising said all network users currently viewing said network resource;

transmitting said network resource, said list, and a collaboration menu to said network user, said collaboration menu comprising at least one user collaboration option.

2. The method of claim 1 wherein said address specification is a web page address.

3. A method for multi-user awareness and collaboration in a computer network environment, comprising:

obtaining registration information from a network user, said registration information comprising said network user's identification;

retaining said registration information in a repository of user information;

generating a graphical user interface (GUI) in a display area of a browser program, said GUI having an input field configured to accept an address specification by said network user for a network resource, wherein said network resource does not provide a direct access to a chat room;

executing said browser program to capture said address specification entered by said network user into said input field;

transmitting said address specification to a server upon capturing of said address specification from said input field;

storing said address specification in said repository of user information in an entry associated with said network user, said repository identifying all network users currently viewing said network resource;

generating from said repository a list comprising said all network users currently viewing said network resourse;

transmitting said network resource, said list, and a collaboration menu to said network user, said collaboration menu comprising at least one user collaboration option.

4. The method of claim 3, wherein said registration information further comprises:

said user's name;

said user's electronic mail address.

5. The method of claim 3 wherein said address specification is a web page address.

6. A method for multi-user awareness and collaboration in a computer network environment, comprising:

obtaining registration information from a network user, said registration information comprising said network user's identification;

retaining said registration information in a repository of user information;

capturing a web page address for a network resource specified by said network user, wherein said network resource does not provide a direct access to a chat room;

storing said web page address in said repository of user information, said repository of user information identifying all network users currently viewing said network resource;

generating from said repository a list comprising said all network users currently viewing said network resource;

transmitting said network resource, said list, and a collaboration menu to said network user, said collaboration menu comprising at least one user collaboration option.

7. The method of claim 6 wherein said registration information further comprises:

said user's name;

said user's electronic mail address.

8. A computer program product comprising:

a computer usable medium having computer readable program code embodied therein for multi-user awareness and collaboration in a computer network environment comprising:

computer readable program code configured to cause a server computer to obtain registration information from a network user, said registration information comprising said network user's identification, name, and electronic mail address;

computer readable program code configured to cause a server computer to retain said registration information in a repository of user information;

computer readable program code configured to cause a client computer to capture an address specification for a network resource requested by said network user, wherein said network resource does not provide a direct access to a chat room;

computer readable program code configured to cause said server computer to store said address specification in said repository of user information, said repository of user information having identification information of all network users currently viewing said network resource;

computer readable program code configured to cause said server computer to generate from said repository of user information a list comprising said all network users currently viewing said network resource;

computer readable program code configured to cause said server computer to transmit said network resource, said list, and a collaboration menu to said network user, said collaboration menu comprising at least one user collaboration option.

9. The computer program product of claim 8 wherein said address specification is a web page address.

10. A computer program product comprising:

a computer usable medium having computer readable program code embodied therein for multi-user awareness and collaboration in a computer network environment comprising:

computer readable program code configured to cause a server computer to obtain registration information from a network user, said registration information comprising said network user's identification;

computer readable program code configured to cause a server computer to retain said registration information in a repository of user information;

computer readable program code configured to cause a client computer to generate a graphical user interface (GUI) in a display area of a browser program, said GUI having an input field configured to accept an address specification by said network user for a network resource, wherein said network resource does not provide a direct access to a chat room;

computer readable program code configured to cause said client computer to execute said browser program to capture said address specification entered by said network user into said input field;

computer readable program code configured to cause said client computer to transmit said address specification to said server upon capturing of said address specification from said input field;

computer readable program code configured to cause said server computer to store said address specification in said repository of user information in an entry associated with said network user, said repository identifying all network users currently viewing said network resource;

computer readable program code configured to cause said server computer to generate from said repository a list comprising said all network users currently viewing said network resource;

computer readable program code configured to cause said server computer to transmit said network resource, said list, and a collaboration menu to said network user, said collaboration menu comprising at least one user collaboration option.

11. The computer program product of claim 10 wherein said registration information further comprises:

said user's name;

said user's electronic mail address.

12. The computer program product of claim 10 wherein said address specification is a web page address.

13. A computer program product comprising:

a computer usable medium having computer readable program code embodied therein for multi-user awareness and collaboration in a computer network environment comprising:

computer readable program code configured to cause a server computer to obtain registration information from a network user, said registration information comprising said network user's identification;

computer readable program code configured to cause a server computer to retain said registration information in a repository of user information;

computer readable program code configured to cause a client computer to capture a web page address for a network resource specified by said user, wherein said network resource does not provide a direct access to a chat room;

computer readable program code configured to cause said server computer to store said web page address in said repository of user information, said repository of user information identifying all network users currently viewing said network resource;

computer readable program code configured to cause said server computer to generate from said repository a list comprising said all network users currently viewing said network resource; computer readable program code configured to cause said server computer to transmit said network resource, said list, and a collaboration menu to said network user, said collaboration menu comprising at least one user collaboration option.

14. The computer program product of claim 13 wherein said registration information further comprises:

said user's name;

said user's electronic mail address.

15. An system for providing multi-user awareness and collaboration in a computer network environment, comprising:

one or more servers in a network environment, said one or more servers obtaining registration information from a network user and retaining said registration information in a repository of user information, said registration information comprising said network user's identification, name, and electronic mail address;

a client computer in said network environment being used by said network user, said client computer capturing an address specification for a network resource requested by said network user, wherein said network resource does not provide a direct access to a chat room, transmitting said address specification to said one or more servers, said one or more servers storing said address specification in said repository of user information, said repository of user information identifying all network users currently viewing said network resource, said one or more servers generating from said repository of user information a list comprising said all network users currently viewing said network resource, said one or more servers transmitting said network resource, said list, and a collaboration menu to said network user, said collaboration menu comprising at least one user collaboration option.

16. The system of claim 13 wherein said address specification is a web page address.

17. A system for providing multi-user awareness and collaboration in a computer network environment, comprising:

one or more servers in a network environment, said one or more servers obtaining registration information from a network user and retaining said registration information in a repository of user information, said registration information comprising said network user's identification;

a client computer in said network environment being used by said network user, said client computer generating a graphical user interface (GUI) in a display area of a browser program, said GUI having an input field configured to accept an address specification by said network user for a network resource, wherein said network resource does not provide a direct access to a chat room, said client computer executing said browser program to capture said address specification entered by said network user into said input field and transmitting said address specification to said one or more servers upon capturing of said address specification from said input field, said one or more servers storing said address specification in said repository of user information in an entry associated with said network user, said repository identifying all network users currently viewing said network resource, said one or more servers generating from said repository a list comprising said all network users currently viewing said network resource, said one or more servers transmitting said network resource, said list, and a collaboration menu to said network user, said collaboration menu comprising at least one user collaboration option.

18. The system of claim 17 wherein said registration information further comprises:

said user's name;

said user's electronic mail address.

19. The system of claim 17 wherein said address specification is a web page address.

20. A system for providing multi-user awareness and collaboration in a computer network environment, comprising:

one or more servers in a network environment, said one or more servers obtaining registration information from a network user and retaining said registration information in a repository of user information, said registration information comprising said network user's identification;

a client computer in said network environment being used by said network user, said client computer capturing a web page address for a network resource specified by said network user, wherein said network resource does not provide a direct access to a chat room, transmitting said web page address to said one or more servers, said one or more servers storing said web page address in said repository of user information, said repository of user information identifying all network users currently viewing said network resource, said one or more servers generating from said repository a list comprising said all network users currently viewing said network resource, said one or more servers transmitting said network resource, said list, and a collaboration menu to said network user, said collaboration menu comprising at least one user collaboration option.

21. The system of claim 20 wherein said registration information further comprises:

said user's name;

said user's electronic mail address.

* * * * *